(12) United States Patent
Wit et al.

(10) Patent No.: US 10,753,440 B2
(45) Date of Patent: Aug. 25, 2020

(54) ACTUATOR RELEASE MECHANISM

(71) Applicant: Hamilton Sundstrand Corporation, Charlotte, NC (US)

(72) Inventors: Marek Wit, Jawor (PL); Rafał Lewandowski, Żarów (PL); Dawid Lewandowski, Oleśnica (PL); Artur Hilgier, Wrocław (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/672,403

(22) Filed: Aug. 9, 2017

(65) Prior Publication Data
US 2018/0100565 A1    Apr. 12, 2018

(30) Foreign Application Priority Data

Oct. 10, 2016   (EP) .................................... 16461563

(51) Int. Cl.
| | | |
|---|---|---|
| *B64D 41/00* | (2006.01) | |
| *F16H 21/06* | (2006.01) | |
| *F16H 21/44* | (2006.01) | |
| *F16H 51/00* | (2006.01) | |

(52) U.S. Cl.
CPC ........... *F16H 21/44* (2013.01); *B64D 41/007* (2013.01); *F16H 21/06* (2013.01); *F16H 51/00* (2013.01)

(58) Field of Classification Search
CPC .......... F16H 21/44; F16H 21/06; F16H 51/00; B64D 41/007; E05B 47/0673; E05B 2047/0025; E05C 9/043; E05C 19/12; E05C 9/1875

USPC ............................................................. 74/89
See application file for complete search history.

(56) References Cited

U.S. PATENT DOCUMENTS

| | | | |
|---|---|---|---|
| 789,906 A | | 5/1905 | Gordon |
| 1,204,396 A | * | 11/1916 | Boon ...................... E05C 9/043 |
| | | | 292/36 |
| 4,552,000 A | * | 11/1985 | Lipschutz ......... B60R 25/02105 |
| | | | 292/341.15 |

(Continued)

FOREIGN PATENT DOCUMENTS

| | | | | |
|---|---|---|---|---|
| DE | 1147793 B | * | 4/1963 | ............. A01B 3/426 |
| DE | 10112983 C1 | * | 7/2002 | ............. B21C 47/26 |

(Continued)

OTHER PUBLICATIONS

Extended European Search Report for International Application No. 16461563.5 dated Apr. 24, 2017, 7 pages.

*Primary Examiner* — Jake Cook
*Assistant Examiner* — Gregory Robert Weber
(74) *Attorney, Agent, or Firm* — Cantor Colburn LLP

(57) ABSTRACT

An actuator release mechanism comprising a longitudinal member, e.g. a piston, which is moveable axially to permit or prevent axial movement of the lock bolt and hence deployment of the actuator. Movement of the piston is due to the force of the lock bolt, under a spring force, on the one hand, and to the position and force of a linkage assembly on the other hand. The linkage assembly comprises a first link fixed, at one end, e.g. by means of a piston lock pin, to the piston and fixed at a pivot point to a second link. The second link is fixed to a rotational drive means, here a rotary solenoid or stepper motor, so as to rotate about a centre of rotation.

3 Claims, 10 Drawing Sheets

(56) References Cited

U.S. PATENT DOCUMENTS

| | | | | |
|---|---|---|---|---|
| 4,635,911 | A | * | 1/1987 | Lovrenich ............... B25B 5/06 269/224 |
| 6,758,503 | B2 | * | 7/2004 | Sadler ..................... E05B 5/00 292/35 |
| 7,140,213 | B2 | * | 11/2006 | Feucht ............. B60R 25/02153 70/186 |
| 7,712,798 | B2 | * | 5/2010 | Kraus ................... E05B 1/0046 292/169 |
| 7,775,564 | B2 | * | 8/2010 | Moore ................. E05B 13/001 220/730 |
| 8,640,563 | B2 | | 2/2014 | Lang et al. |
| 9,193,472 | B2 | | 11/2015 | Sasscer |
| 9,663,968 | B2 | * | 5/2017 | Witterstaetter ..... E05B 17/2038 |
| 2003/0080567 | A1 | * | 5/2003 | Peacock ................ E05C 9/043 292/3 |
| 2004/0168502 | A1 | * | 9/2004 | Schulte ................... B30B 1/10 72/451 |
| 2005/0193932 | A1 | * | 9/2005 | Denison ............. E05B 47/0012 109/59 R |
| 2013/0299633 | A1 | | 11/2013 | Tierney et al. |
| 2013/0327207 | A1 | | 12/2013 | Sasscer et al. |
| 2015/0096437 | A1 | | 4/2015 | Russ |
| 2015/0232195 | A1 | | 8/2015 | Bannon |

FOREIGN PATENT DOCUMENTS

| | | | | |
|---|---|---|---|---|
| GB | 587381 | A * | 4/1947 | ............. E21F 15/06 |
| GB | 2093902 | A * | 9/1982 | ................ B60P 1/26 |
| WO | WO-8702642 | A1 * | 5/1987 | ........... B64D 41/007 |

* cited by examiner

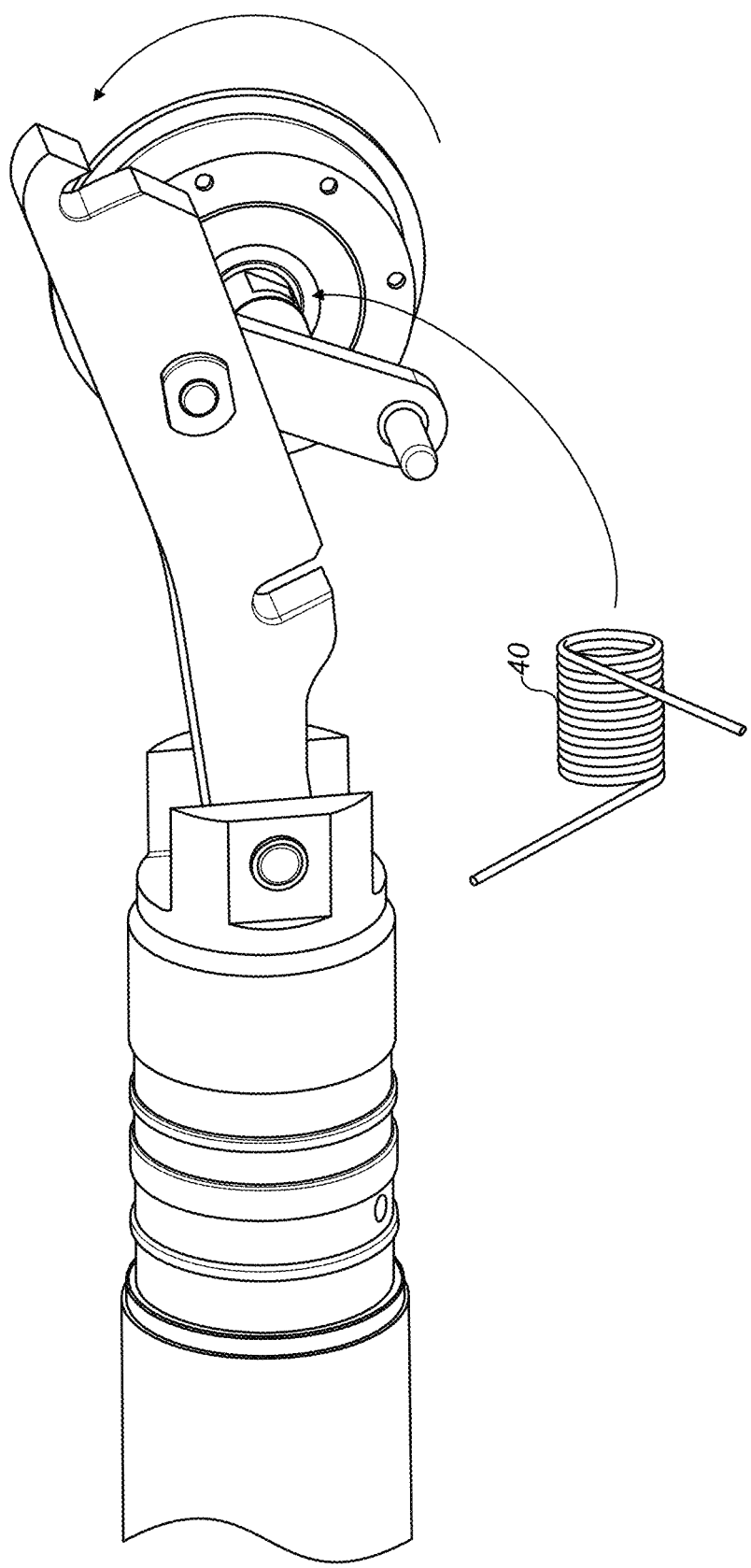

ACTUATOR RELEASE MECHANISM

FOREIGN PRIORITY

This application claims priority to European Patent Application No. 16461563.5 filed Oct. 10, 2016, the entire contents of which is incorporated herein by reference.

TECHNICAL FIELD

The present disclosure relates to release and locking mechanisms for deployable components. The mechanism is particularly suitable as an unlocking or release mechanism for a ram air turbine (RAT) actuator but could also find application in other deployable or movable systems such as other actuators, valves, pumps and the like.

BACKGROUND

Many systems and mechanisms are known in which a component is movable between a closed or stowed position and an open or deployed position, and wherein a component should be locked in the desired position and unlocked to permit movement between the positions. Particular examples are valves or actuators, such as RAT actuators as described in more detail below.

Locking mechanisms are known to secure the actuator, valve etc. in a particular position, and unlocking mechanisms are known to release the locking mechanism and permit movement of the actuator/valve components to a different position, whereupon the actuator components can then also be locked in the second position by means of a locking mechanism. A locking mechanism for a RAT actuator is disclosed, for example, in US 2013/0327207.

Ram air turbines are used in aircraft to provide electric and/or hydraulic power to components of the aircraft, for example in the event of failure of other electrical or hydraulic power generating equipment on board the aircraft. In normal operation of the aircraft, the RAT is housed within the aircraft, but when needed it is extended into the airflow around the aircraft such that it may turn, due to the airflow, and generates electrical and/or hydraulic power. The RAT is typically pivoted into position by means of an actuator, for example a hydraulic actuator. The actuator typically includes a lock bolt which extends to deploy the RAT. The actuator has a lock mechanism which prevents inadvertent movement of the lock bolt and, thus, inadvertent deployment of the RAT. The main locking mechanism typically comprises a spring loaded lock bolt which must be moved in an axial direction to unlock the actuator. Such an actuator is disclosed, for example, in US 2015/0232195. RAT actuators are also disclosed in U.S. Pat. Nos. 8,640,563, 9,193,472 and US 2015/0096437.

An unlocking mechanism is provided to permit the axial bolt movement. A conventional unlocking mechanism is shown, for example, in FIGS. 2A to 2C, comprising a linkage arrangement, one end of which is rotatably coupled to one end of the lock bolt and the other end of which is axially fixed and rotatably coupled to, for example, a mounting wall. A solenoid moves the link between a locked (FIG. 2A) and an unlocked (FIG. 2B) position. In the locked position, the linkage assembly pushes against the lock bolt against the force of the lock bolt spring to prevent axial movement of the lock bolt. The assembly is in an over-centred position held by a spring and the lock bolt force. When it is required to deploy the RAT, the lock bolt needs to be released for axial movement of the actuator. As seen in FIG. 2B, a pull force, greater than the spring force, is exerted on the linkage assembly by means of a solenoid, which moves the linkage assembly to an under-centred position and out of engagement with the lock bolt. This allows the lock bolt to move axially to initiate actuator unlocking to permit deployment. The solenoid must have sufficient force to displace the lock bolt against the force of the lock bolt spring and the linkages and joints require sufficient axial and radial space and may also be prone to wear or damage.

The size and weight of components is of particular concern in aircraft where there is a desire to use lighter and smaller components, whilst maintaining safety and reliability. In addition, the conventional mechanism has been found to have some vulnerability to inadvertent self-deployment or failure to deploy due to the fact that there is a very small distance between the over-centred position (FIG. 2A) and the under-centred position (FIG. 2B) of the cross-rod. Only a small force, therefore, is required to deploy the actuator and this could happen accidentally, due, e.g., to vibrations.

There is a desire, therefore, to provide a locking/unlocking mechanism for such systems to prevent/permit axial movement of a component such as a lock bolt, without the need for very large solenoids and a series of links and in a more compact arrangement, and in which there is a reduced risk of inadvertent deployment.

SUMMARY

The present invention provides an actuator release mechanism comprising: a longitudinal member moveable along an axis between a lock position and a release position; a linkage assembly and a rotational drive means, wherein the linkage assembly comprises a first link connected to the longitudinal member and pivotally connected to a second link, the second link fixedly connected to the rotational drive means to rotate, with the rotational drive means, around a centre of rotation; and wherein rotation of the second link causes the pivot point to rotate about the centre of rotation causing axial movement of the longitudinal member.

In a preferred embodiment the actuation means comprises a rotational solenoid or a stepper motor.

The mechanism may also include retaining means e.g. a cooperating pin and groove arrangement on the links to retain or lock the links in respective deployed or stowed positions.

The longitudinal member is preferably a piston.

In one aspect, the disclosure provides an actuator assembly comprising a lock bolt, and a release mechanism as defined above, moveable relative to the lock bolt to permit or prevent axial movement of the lock bolt.

BRIEF DESCRIPTION OF THE DRAWINGS

Preferred embodiments will now be described by way of example only and with reference to the accompanying drawings in which:

FIG. 8 shows the arrangement of FIG. 3 being unlocked from the deployed position for stowing the actuator.

DETAILED DESCRIPTION

Figure 1:
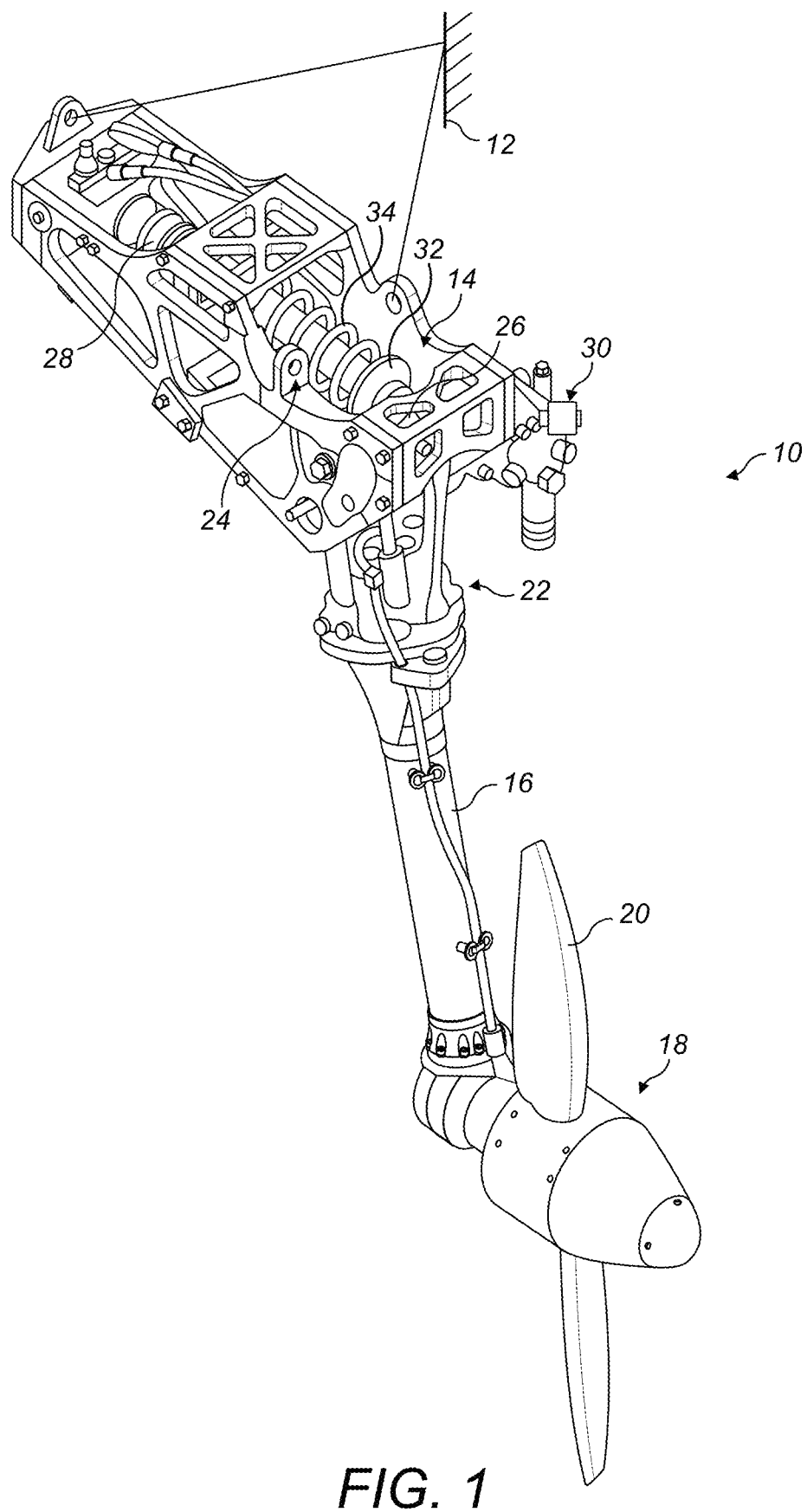
FIG. 1 shows a ram air turbine (RAT)

FIG. 1 shows a RAT system 10 which is secured to an aircraft structure 12 by housing 14. The housing 14 pivotally supports a strut 16 having a turbine 18 at one end. The turbine 18 includes blades 20 which impart rotational drive to a generator 22 and a hydraulic pump 30, for example. An actuator 24 is secured to the strut at a first end 26 and to the housing at a second end 28. The actuator 24 is illustrated in its deployed position. The actuator 24 comprises a cylinder 32 which is biased by a spring 34 in order to deploy the strut 16. When the cylinder 32 is retracted, it is held in its retracted position by means of a lock bolt of a locking mechanism, details of which will be described below.

The unlocking or release of the actuator is initiated by permitting movement of the lock bolt 38. This is made possible by means of a release mechanism according to the present disclosure which will be described further below.

Figure 2A:
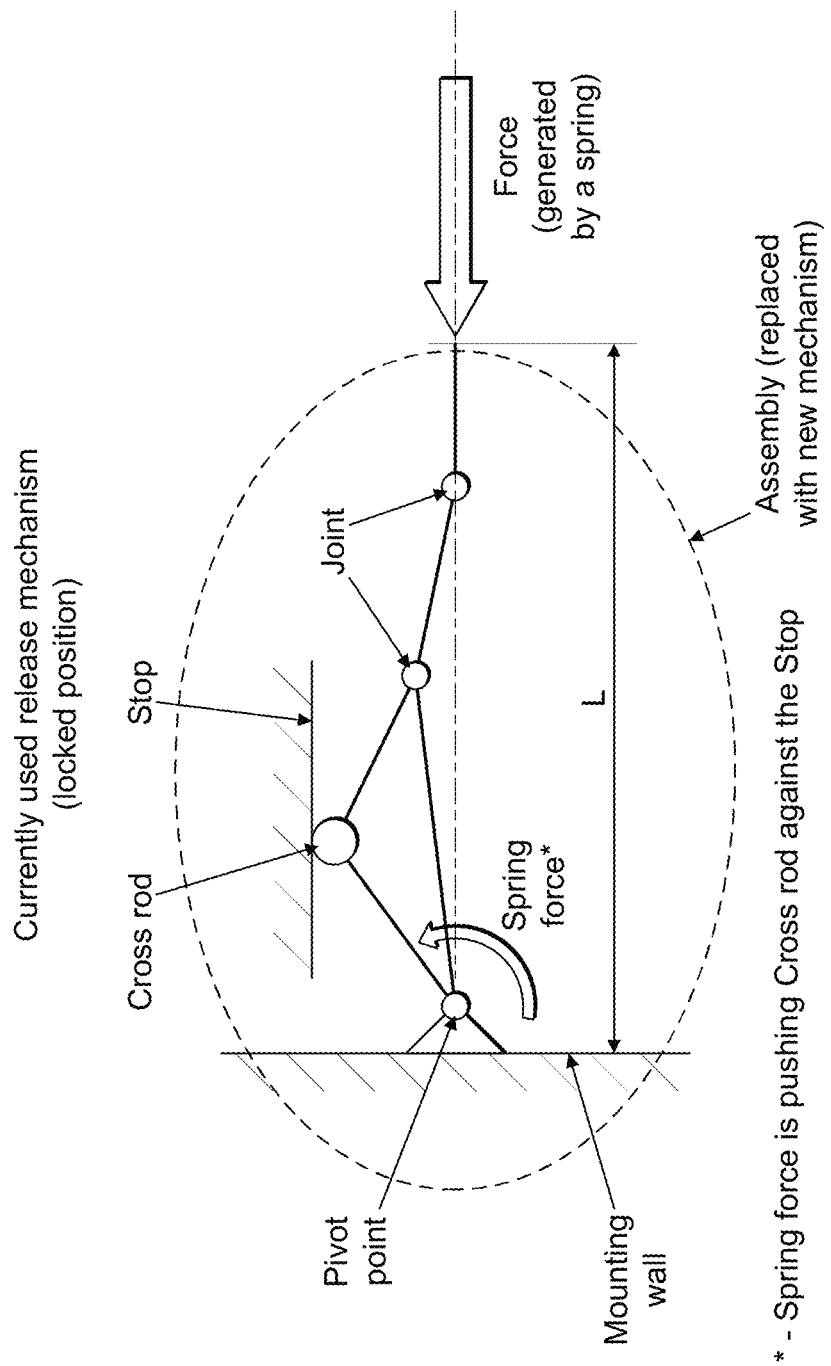
FIG. 2A shows a schematic view of a typical prior art linkage release mechanism in the locked position.
Figure 2B:
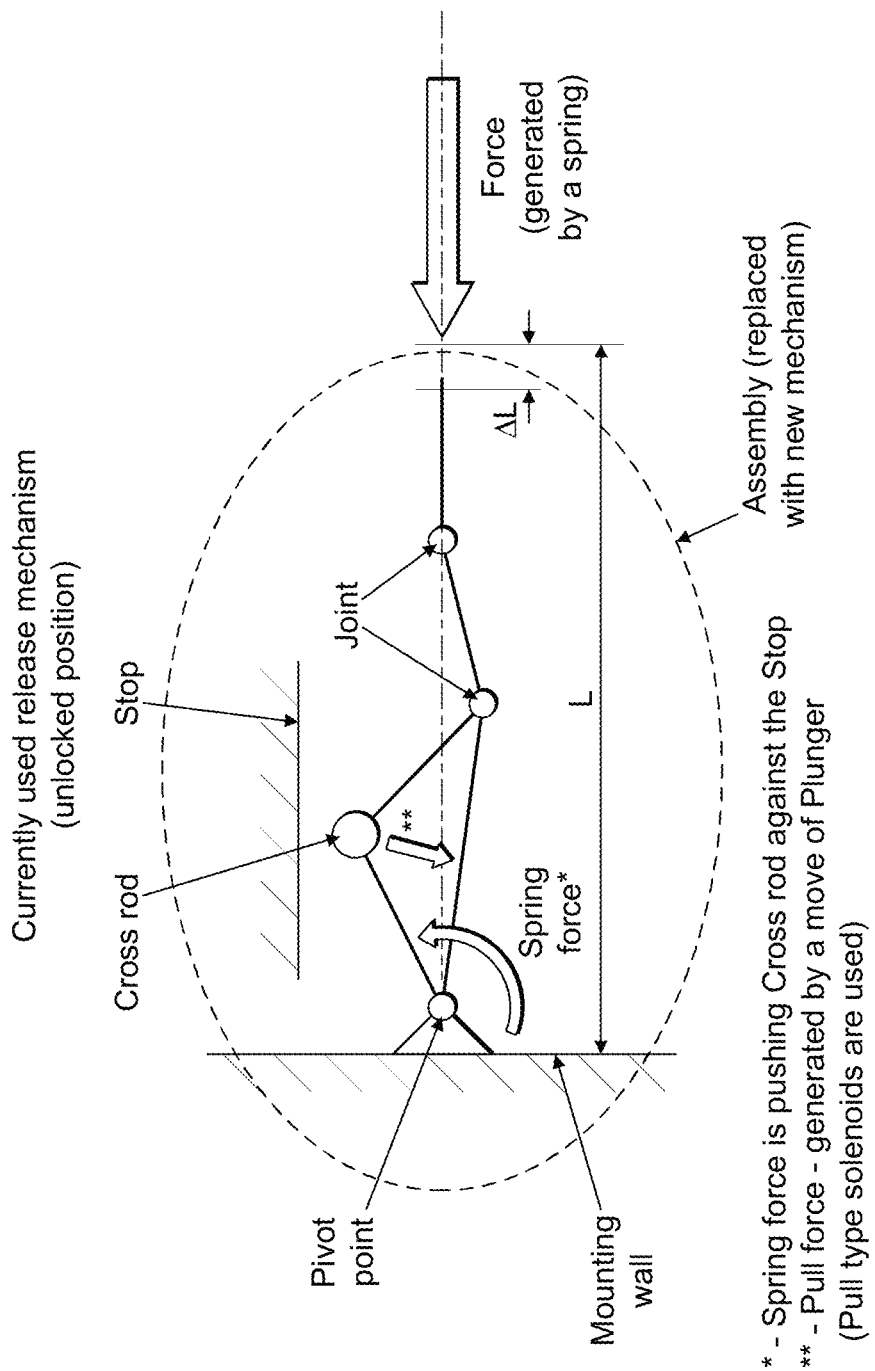
FIG. 2B shows the prior art mechanism of FIG. 2A in the unlocked position.
Figure 2C:
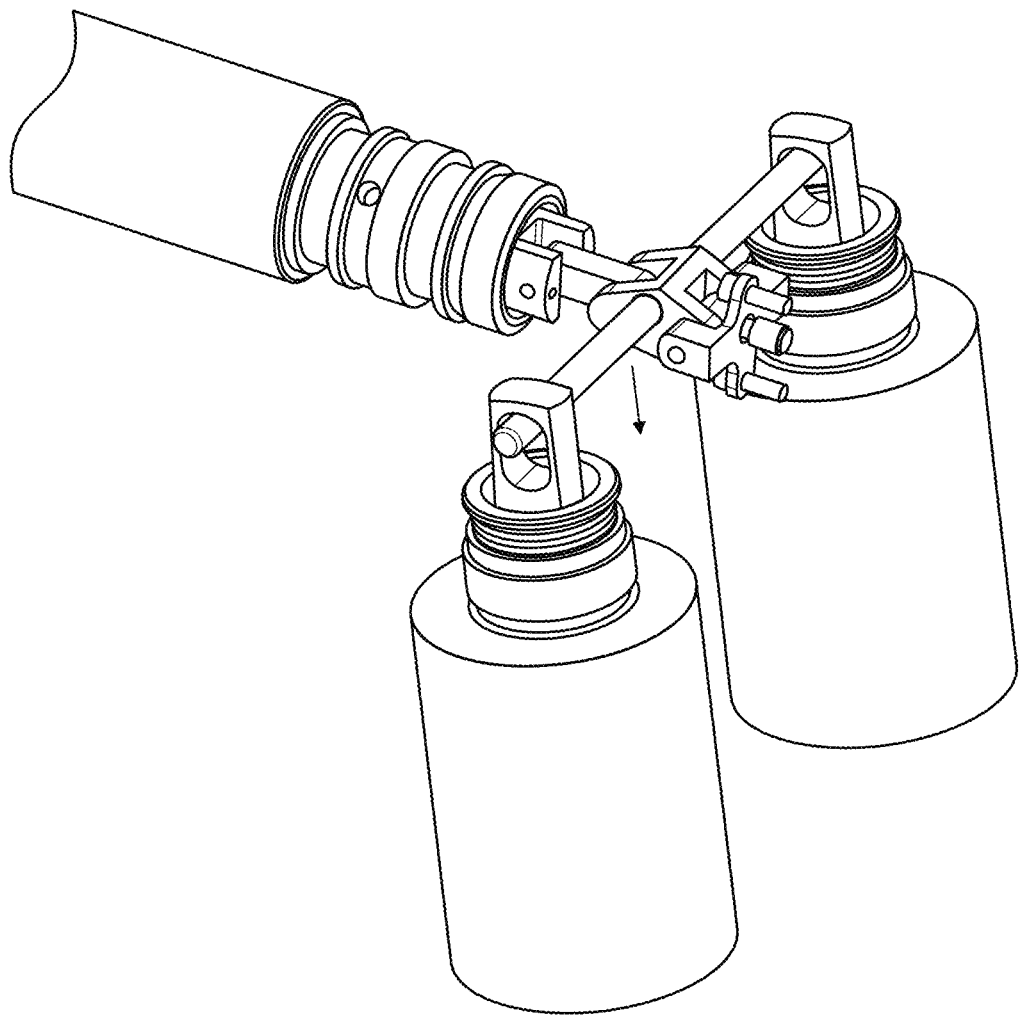
FIG. 2C shows a perspective view of a prior art release mechanism as shown in FIGS. 2A and 2B.
Figure 3:
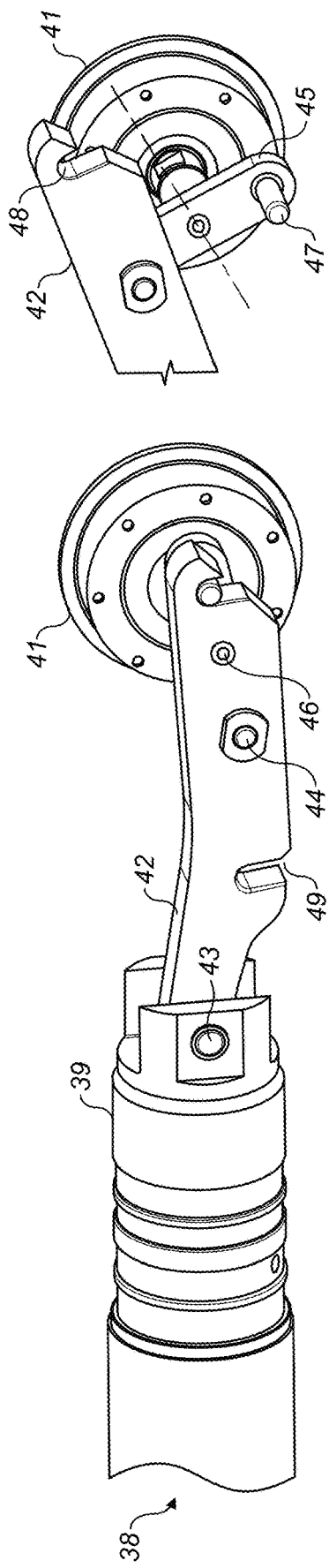
FIG. 3 shows a perspective view of the piston lock and linkage arrangement of the release mechanism, which would replace the conventional mechanism shown within the dashed lines of FIGS. 2A and 2B.

FIG. 3 shows a view of a release mechanism of this disclosure which would replace the conventional, linkage-type mechanism shown within the dashed lines of FIGS. 2A and 2B and shown in FIG. 2C.

FIGS. 3 to 8 show how the piston 39 and release mechanism respond when the actuator is to be deployed and when the actuator is to be stowed.

With reference to FIGS. 3 to 8, the preferred release mechanism comprises a longitudinal member, e.g. a piston 39, which is moveable axially to permit or prevent axial movement of the lock bolt 38 and hence deployment of the actuator. Movement of the piston 39 is due to the force of the lock bolt 38, under a spring force, on the one hand, and to the position and force of a linkage assembly on the other hand. The linkage assembly comprises a first link 42 fixed, at one end, e.g. by means of a piston lock pin 43, to the piston 39 and fixed at a pivot point 44 to a second link 45. The second link 45 is fixed to a rotational drive means, here a rotary solenoid or stepper motor 41, so as to rotate about a centre of rotation 46. The linkage assembly also includes retaining means to retain or lock the links in the respective deployed and stowed positions. In the examples shown, the second link 45 is provided with a pin 47 and the first link 42 is provided with two grooves or detents 48 and 49 in which the pin 47 engages in the respective end positions.

Figure 4:
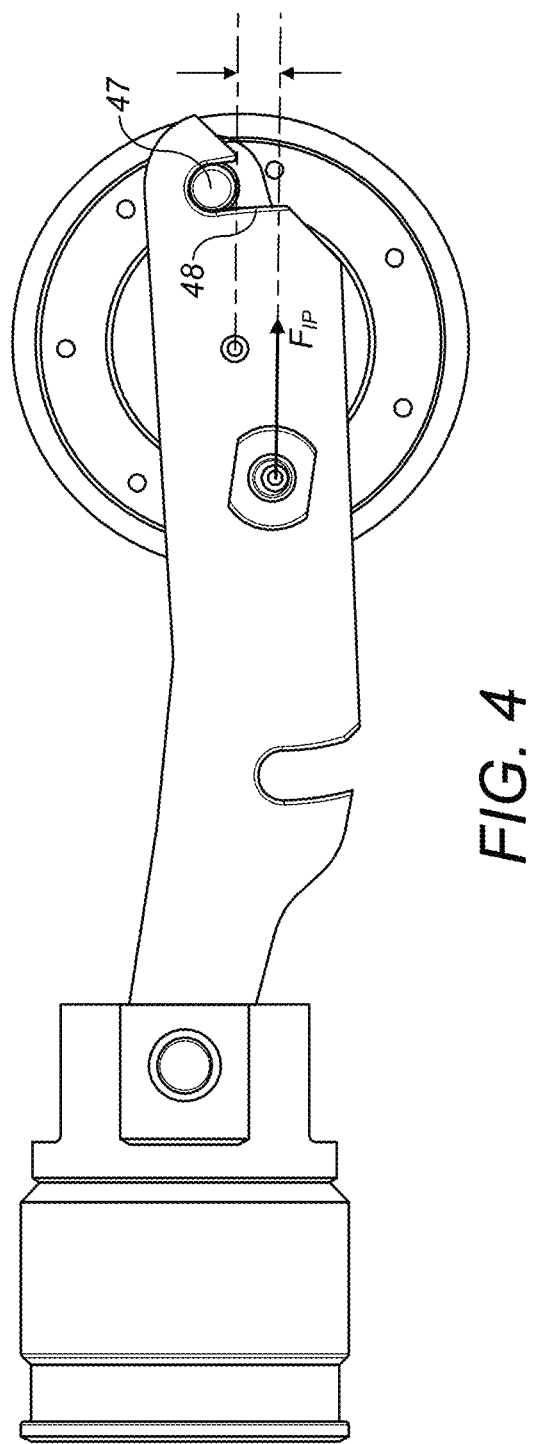
FIG. 4 shows the arrangement of FIG. 3 in a stowed, locked position.

FIG. 4 shows the assembly locked in the stowed position—i.e. with the linkage assembly in the centre position such that the piston 39 is forced against a force of the lock bolt 38, i.e. to the left in the drawings, thus preventing axial movement of the lock bolt 38 and preventing deployment of the actuator.

The solenoid is reenergised in this position and the pin 47 is retained in groove 48.

To deploy the actuator, the lock bolt 38 must be able to move axially—usually a short distance of around 9 mm. To allow this, some axial space must be provided between the toggle/piston and the lock bolt which means that the piston 39 will need to be moved axially away from the lock bolt.

Figure 5:
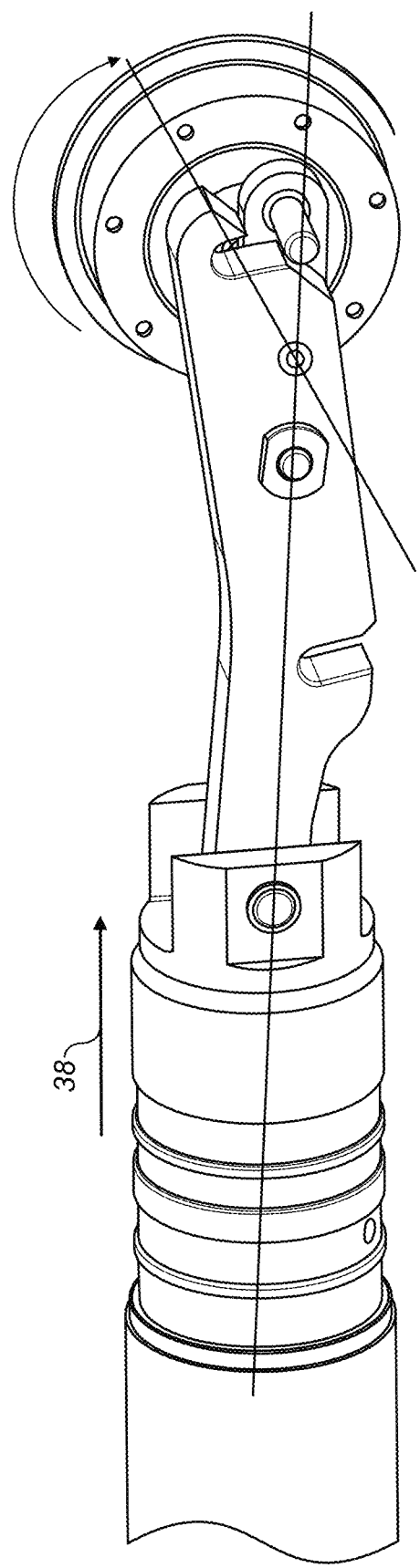
FIG. 5 shows the arrangement of FIG. 3 moving out of the locked position.
Figure 6:
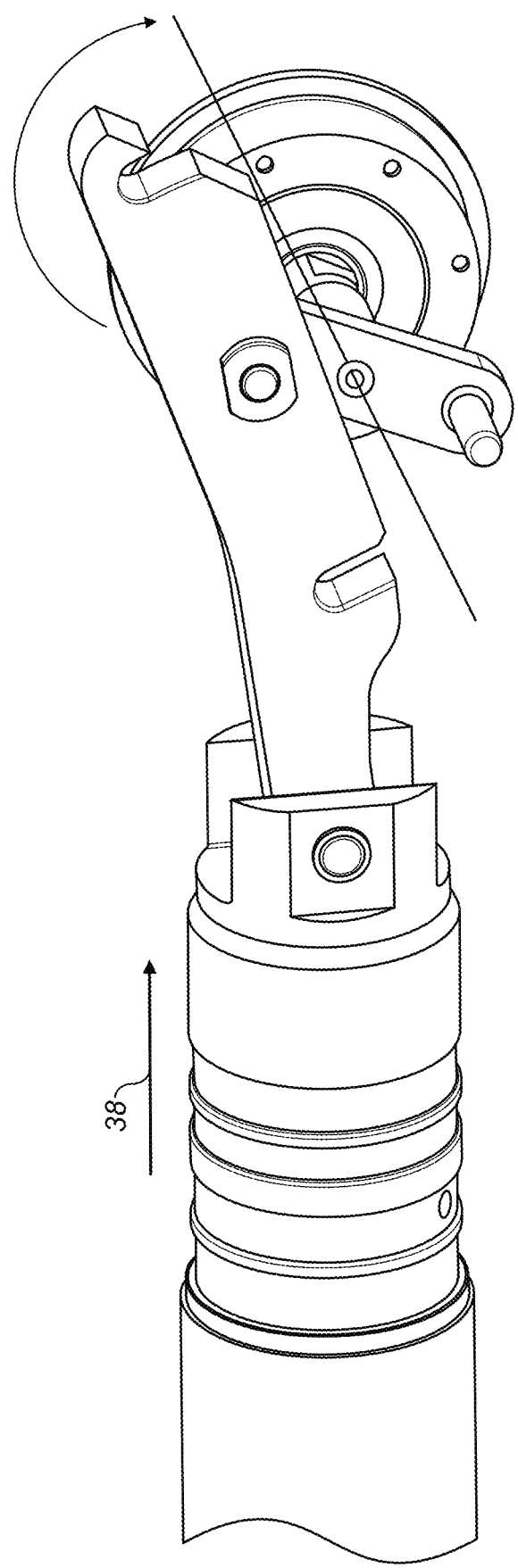
FIG. 6 shows the arrangement of FIG. 3 in a position for deployment of the actuator.
Figure 7:
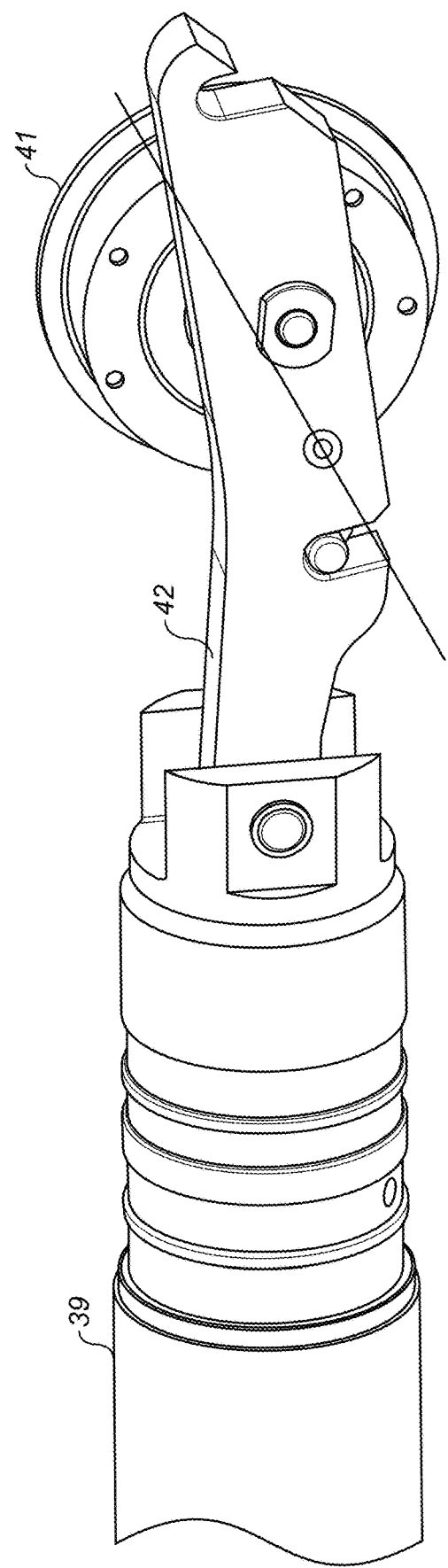
FIG. 7 shows the arrangement of FIG. 3 locked in a deployed position.

In the present mechanism, this is done by activating or energizing the rotational drive means e.g. the solenoid 41. As the rotational solenoid, or drive means, 41 is energised, it rotates causing corresponding rotation of the second link 45 about the centre of rotation 46. As the second link 45 rotates, it pivots, relative to the first link 42 about the pivot point 44 and the pin 47 moves out of the groove 48 (FIG. 5). Once the second link has rotated under the rotational force of the energised solenoid by a distance r, the force Flp from the lock piston 39 is sufficient to act on the first link 42 such that it pivots upwards about the pivot point, relative to the second link. The resulting momentum M=Flp·r causes the solenoid 41 to continue to rotate, without being energised, thus causing the second link to also rotate about the centre of rotation 46 (FIG. 6) until it abuts against the first link 42 and, in this example, locks in position via the pin 47 engaging in groove 49 (FIG. 7). The piston is now in an axially displaced position (to the right in the drawings) meaning that the lock bolt 38 can move axially under the force of the lock bolt spring mechanism and the actuator can deploy. The pin/groove retaining secures the assembly in this deployed position making the assembly less sensitive to vibrations etc. When the lock bolt has reached its deployment position, the actuator deployment mechanism which, in the case of a RAT, for example, comprises rollers and uplock pawls, can operate to deploy the actuator.

Whilst the objectives of the present release mechanism are achieved with the mechanism described above, the examples described are not limiting.

When the actuator is no longer to be deployed, it is stowed. To stow the actuator, the second link needs to be rotated back to the start position. This can be done in various ways, provided force is applied to overcome the locking force.

In one embodiment, the solenoid 41 is energised to rotate in a reverse direction, causing the second link to rotate the pin 47 out of the groove 49 and past the over-centred position until it engages in groove 48 in the locked stowed position (FIG. 4). In another example, a torsional spring 40 in the linkage assembly returns the second link by means of energy stored in the spring during deployment. The torsional spring can be located axially on pivot 44 and it can be supported between first 42 and second link 45 generating torque in between components 42 and 45. Generated torque will allow the links to return to the stowed locked position from the deployed unlocked position and it also additionally secures the mechanism to remain in the stowed locked position during flight conditions. The torsional spring can also be placed on a shaft of the solenoid valve at the center of rotation 46. It can be connected to pivot point 44 and on the second end on some non-moving part of solenoid 41. Rotation of link 45 generates potential energy in the spring, and as soon as force from the lock bolt 38 is removed, energy is released causing counter clockwise rotation of the second link 45. In the locked, stowed position, the piston and linkage assembly prevent axial movement of the lock bolt and, hence, prevent deployment of the actuator.

The shapes and positions of the grooves 48 and 49 can be varied or designed to provide the required momentum and piston stroke for stowing/locking.

The arrangement of the present release mechanism requires significantly fewer component parts as compared to the linkage system of the prior art, which, in turn, reduces the manufacturing, assembly and testing costs and avoids the need for shims as in the prior art systems. This can result in a more reliable and smaller deployment system.

This mechanism could be easily adapted to existing actuators or implemented in future actuators.

The above is a description of a single embodiment by way of example only. Modifications may be made without departing from the scope of this disclosure.

While the apparatus has been described in the context of unlocking a RAT actuator, it may, as mentioned above, find use in other applications, for example of the types of actuator, valves, pumps or the like. The system could also be implemented in other systems where rotary movement is to be changed to linear movement.

The drive means, e.g. solenoid, is only required to be energised to provide the initial rotation, after which the momentum causes the linkage movement. Therefore, a small, low power solenoid or motor can be used.

The system is more reliable and safe than conventional systems and avoid inadvertent deployment or unlocking due, e.g., to vibrations. The arrangement is also less sensitive to manufacturing/assembly errors or tolerance and, therefore, easier and less expensive to make.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A ram air turbine (RAT) system comprising:
   a hydraulic actuator;
   an axially moveable lock bolt that actuates the movement of the actuator; and
   an actuator release mechanism that is moveable relative to the lock bolt between an unlocked position in which axial movement of the lock bolt is permitted and a locked position in which axial movement of the lock bolt is prevented, the actuator release mechanism comprising:
   a longitudinal member moveable along an axis between a lock position and a release position;
   a linkage assembly that includes a first link and a second link; and
   a rotational drive means;
   wherein the first link is connected to the longitudinal member and is pivotally connected to the second link at a pivot point,
   wherein the second link is fixedly connected to the rotational drive means to rotate, with the rotational drive means, around a center of rotation, and
   wherein rotation of the second link causes the pivot point to revolve about the center of rotation causing axial movement of the longitudinal member,
   further comprising retaining means for stopping rotational movement between the first link and the second link, wherein the retaining means comprises a pin extending from an end of the second link, a first groove provided at a first end of the first link arranged to receive the pin at an end position of rotation in a first direction, and a second groove provided at a second end of the first link arranged to receive the pin at an end position of rotation in a second direction,
   wherein, in the locked position, the rotational drive means is deenergized and the first groove of the first link engages with the pin of the second link to prevent axial movement of the longitudinal member, and
   wherein in an the unlocked position, the rotational drive means is energized, and the second groove of the first link engages with the pin of the second link to permit axial movement of the longitudinal member.

2. A ram air turbine system as claimed in claim 1, wherein the rotational drive means comprises a rotational solenoid or a stepper motor.

3. A ram air turbine system as claimed in claim 1, wherein the longitudinal member is a piston.

\* \* \* \* \*